United States Patent [19]

Striffler

[11] Patent Number: 5,663,986
[45] Date of Patent: Sep. 2, 1997

[54] APPARATUS AND METHOD OF TRANSMITTING DATA OVER A COAXIAL CABLE IN A NOISY ENVIRONMENT

[75] Inventor: Foster L. Striffler, New London, Conn.

[73] Assignee: The United States of America as represented by the Secretary of the Navy, Washington, D.C.

[21] Appl. No.: 630,856

[22] Filed: Mar. 25, 1996

[51] Int. Cl.$^6$ .............................. H04L 27/28; H04K 1/10
[52] U.S. Cl. .......................... 375/260; 375/275; 375/303
[58] Field of Search ................................ 375/260, 271, 375/272, 273, 275, 276, 278, 279–281, 284, 285, 295, 302–308, 329, 332, 334, 335, 257

[56] References Cited

U.S. PATENT DOCUMENTS 4,783,779  11/1988  Takahata et al. ......................... 455/17
5,170,413  12/1992  Hess et al. .............................. 375/260
5,243,629   9/1993  Wei ........................................ 375/260
5,497,397   3/1996  Hershey et al. ........................ 375/259

*Primary Examiner*—Stephen Chin
*Assistant Examiner*—Hai H. Phan
*Attorney, Agent, or Firm*—Michael J. McGowan; Michael F. Oglo; Prithvi C. Lall

[57] ABSTRACT

An apparatus and method of transmitting digital data over a coaxial cable in a noisy environment using several carriers with narrower bandwidths in place of the single carrier with a wide bandwidth. In a frequency spectrum, these several carriers are located between interfering harmonic and spurious noise frequencies generated by the other signals, an particularly clock signals. These narrow signals are then combined for transmission over a cable, substantially reducing noise in the signal recovered at the receiving end.

9 Claims, 3 Drawing Sheets

APPARATUS AND METHOD OF TRANSMITTING DATA OVER A COAXIAL CABLE IN A NOISY ENVIRONMENT

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention generally relates to digital data transmission, and, more particularly, to a technique for transmitting digital data in a noisy environment (2) Description of the Prior Art U.S. Pat. No. 4,783,779 to Takahata et al. is directed to frequency assignment in a frequency division multiple access (FDMA) satellite communication system. When a service is a low bit rate signal, the service is transmitted over a single carrier frequency, and its related frequency band. When a service is a high bit rate signal which cannot be transmitted in a single carrier signal, the service is divided into a plurality of low bit rate PSK signals, each of which is transmitted by using a signal carrier frequency and the related frequency band.

However, unlike the satellite environment mentioned above, when digital data is being transmitted via radio on a shared coaxial cable, frequently the data will be contaminated by harmonics or other spurious frequencies that are generated by other signals. Quite often one does not have control of the other signals and so will be unable to reduce the interference.

A digital signal that is used to modulate a carrier by some method such as Biphase Shift Keying (BPSK), Quadriphase Phase Shift Keying (QPSK), amplitude modulation (AM), or frequency modulation (FM) will have a bandwidth that will be proportional to the bit rate of the serial data stream. If the bandwidth of the signal of interest is so wide that the harmonics or spurious signals generated by the other sources contaminate the signal of interest, then it will be necessary to provide some method to overcome this problem.

FIG. 1 shows a typical frequency plot of a spectrum with contaminating harmonic frequencies. The digital data is carried within both the main and side lobes. As shown in FIG. 1, the interfering harmonics 10 (e.g., noisy signals and other transmissions) are present in all the lobes. The carrier is located in the center of the main lobe at position A.

In general, a digital telemetry signal, such as a BPSK, requires a signal to noise ratio (SNR) of about 14 dB to keep the bit error rate at an acceptable level. One solution would be to raise the carrier level of the digital telemetry signal until the SNR was at an acceptable level. However, on a shared coaxial cable the maximum rms voltage level of any signal will be restricted by the other circuit's vulnerability to peak voltage spikes. Thus, there exists a limit to the maximum rms voltage that will be allowed on the coaxial cable.

In addition, noise caused by clock signals transmitted over the same coaxial cable as a signal of interest is particularly problematic in digital communication circuits. The noise from clock signals shows up as phase jitter and causes an unacceptable increase in the bit error rate and SNR.

In light of the foregoing, there exists a need for a method to allow digital telemetry signals to be transmitted on a shared coaxial cable with an acceptable SNR.

SUMMARY OF THE INVENTION

It is therefore an object of the present invention to provide an apparatus and method for transmitting data, which substantially obviates one or more of the problems due to the limitations and disadvantages of the related art.

It is yet another object of the present invention to reduce phase jitter in a recovered signal transmitted over coaxial cable shared with clock signals to thereby improve the bit error rate.

It is yet another object of the present allow a wide bandwidth channel to be separated and positioned into parts of the spectrum that are free from interference thereby allowing wide bandwidth signals to be transmitted in noisy environments.

The present invention uses several carriers with narrow bandwidths in place of a single carrier with a wider bandwidth for transmitting data over a coaxial cable in a noisy environment. These several carriers are located (in frequency) between the harmonic and spurious signals generated by other signals, and particularly clock signals, sharing the cable. Noise on the coaxial cable is thereby reduced allowing a clean signal to be recovered at a receiving end.

To achieve these and other advantages and in accordance with the purpose of the invention, as embodied and broadly described, the invention provides for an apparatus for transmitting data over a coaxial cable in a noisy environment having interfering frequencies. The invention comprises a serial to parallel converter for converting a serial data bit stream into a parallel data bit stream. A carrier generator generates a carrier frequency corresponding to each bit of the parallel data bit stream such that each of the parallel bits may be modulated and transmitted on its own carrier frequency. The carrier generator selects the carrier frequencies such that they are located between the interfering frequencies. Finally, a summer is used to combine the carrier frequencies for transmission over the coaxial cable.

At a receiving end of the cable, a receiver, or group of receivers, one for each frequency, demodulates each of the modulated carrier signals. A parallel to serial converter is then used to combine each of the demodulated signals to recover the serial data stream.

In another aspect, the invention is a method of transmitting data over a coaxial cable in a noisy environment having interfering frequencies, the method comprising the steps of receiving a serial data bit stream; converting the serial data bit stream to a parallel data bit stream; generating a carrier frequency corresponding to each bit of the parallel data bit streams, wherein the carrier frequencies are selected such that they are located between the interfering frequencies; combining the carrier frequencies for transmission over the coaxial cable, and receiving the signals, demodulating the signals an converting the parallel data bit stream back to a serial data bit stream.

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF A PREFERRED EMBODIMENT

The present invention uses several carriers with narrow bandwidths in place of a single carrier with a wider bandwidth to transmit signals over a coaxial cable in a noisy environment having interfering frequencies. These several carriers are located (in frequency) between the harmonic and spurious signals generated by the interfering signals.

Figure 1:
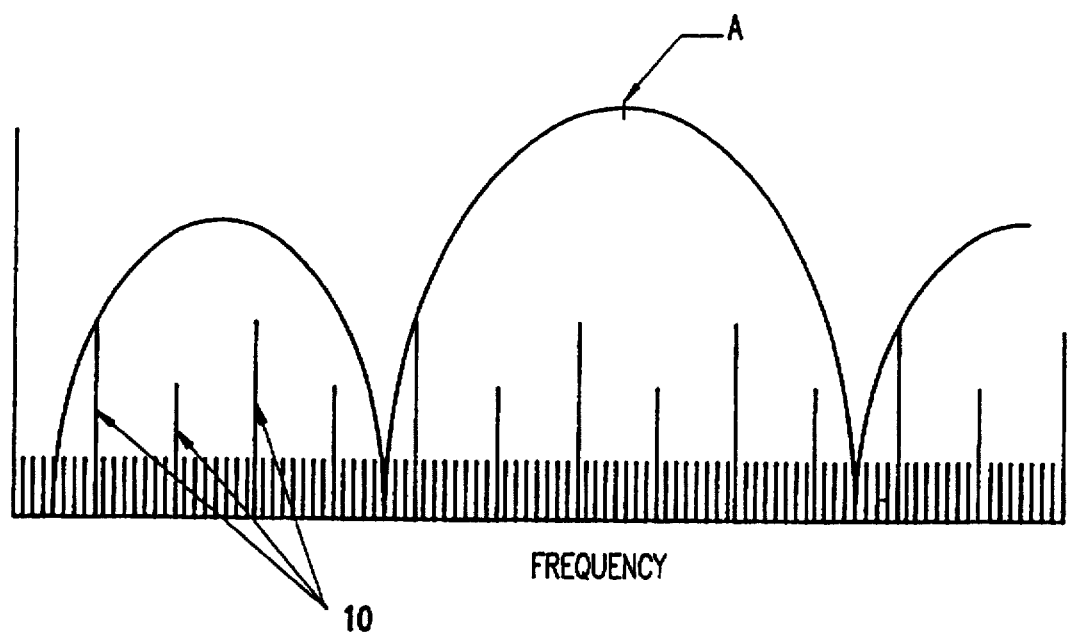
FIG. 1 is an amplitude versus frequency graph of a conventional signal spectrum with main and side lobes and interfering harmonics.
Figure 2:
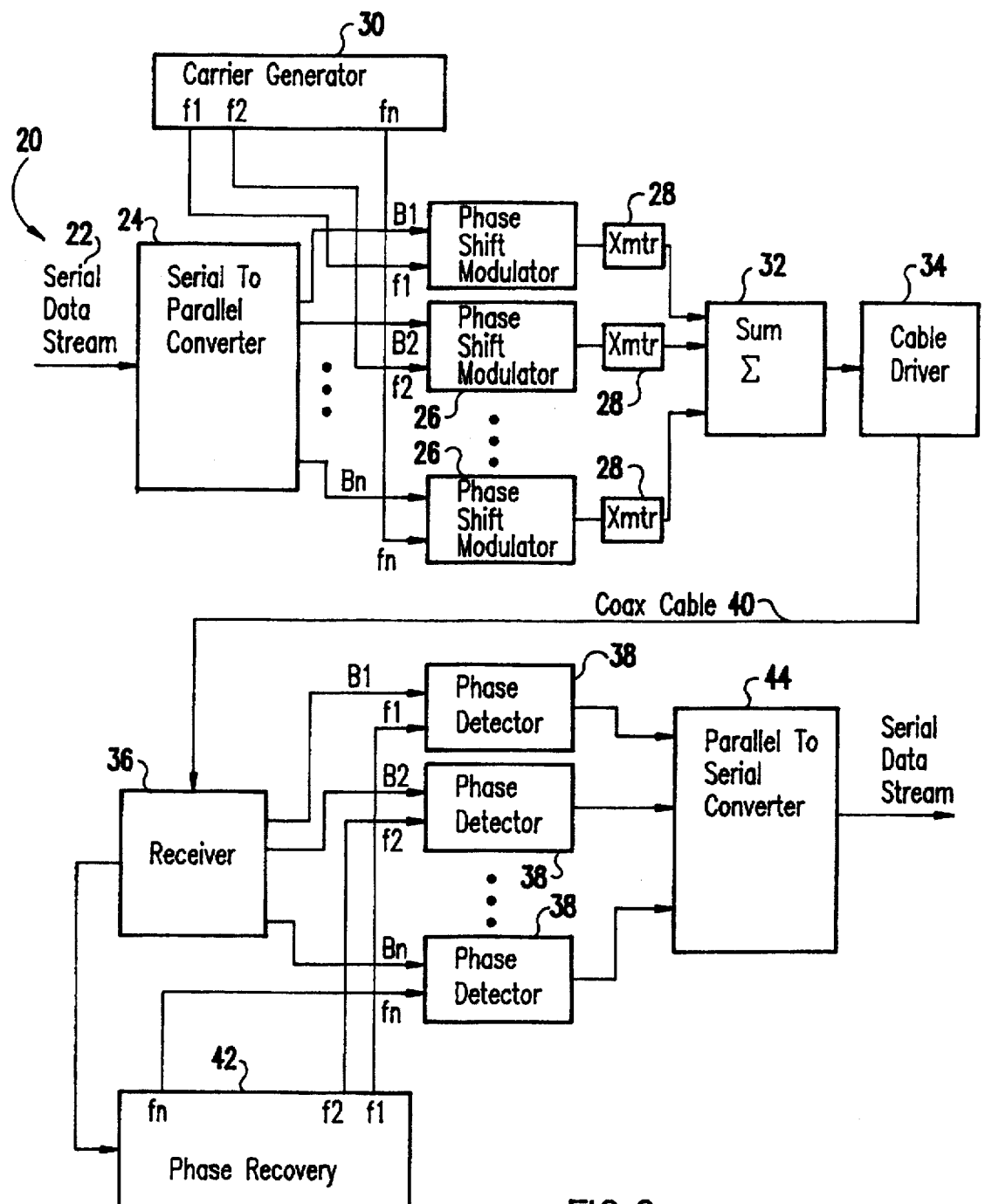
FIG. 2 is a block diagram of an apparatus for transmitting data over a coaxial cable in accordance with the present invention.

Referring now to the drawings, and more particularly to FIG. 2, there is shown a block diagram 20 of an apparatus and method of transmitting data in a noisy environment in accordance with the present invention. Note that one of ordinary skill in the art would understand that the individual components (e.g., receiver, summer, line driver, etc.) of the apparatus of FIG. 2 may be selected from conventional means.

A serial bit stream 22 is first converted to an eight bit parallel stream or, in generalized terms, any suitable n-bit parallel stream of data, by a serial to parallel converter 24. Each of the eight parallel bits (B1, B2 ... Bn) will have its own phase shift modulator 26 and transmitter 28. It is understood that other plural parallel bit streams may be generated in the practice of this invention by selection of the appropriate serial to parallel converter 24.

As will be discussed further below, the carrier frequencies (f1, f2 ... fn) of each of these transmitters 28 will be completely selectable using carrier generator 30 and they will be positioned within the spectrum of the signals on the coaxial cable 40 to be in relatively noise free regions.

If the frequency of each of these carriers (f1, f2, ... fn) could have a harmonic relationship or be derived from a common signal, then the phase relationship of each of these could be maintained and this would simplify the phase recovery 42 and phase detection 38 circuitry in the receiver. Any of the phase shift keying modulation methods of telemetry, such as BPSK or QPSK, will require that the receiver 36 have coherent phase detectors 38 (see, for example, James J. Spilker, Jr., *Digital Communication by Satellite*, Prentice-Hall, at chapter 11, pages 295-335 which is herein incorporated by reference).

In order to perform coherent detection the carrier must be recovered, which requires additional circuitry such as phase locked loops. If the carriers are harmonics of a single base carrier, then the carrier recovery circuits may be made from this single base carrier with the other carriers being derived from the base carrier. This would eliminate the need to make numerous carrier recovery circuits.

Returning to FIG. 2, each of the transmitted signals are combined in summer 32 and sent to a line driver 34 and then onto the coaxial cable 40. At the other end of the cable 40, there will be eight receivers 36 that will receive each of these signals (f1, f2 ... fn) and will convert the modulated signal back to a bit stream (B1, B2 ... Bn). These eight bit parallel signals (or n-bit signals) will then be converted back to a serial bit stream by a parallel to serial shift register 44.

Noise in recovered clock signals are particularly problematic in digital communication circuits. The noise shows up as phase jitter in the clock signals and causes an increase in the bit error rate. To improve this situation, the clock signals f1 through fn in the receiver circuits are generated by the phase recovery circuits 42. Because the carriers are recovered from the total spectrum of the transmitted signals, the noise in the recovered clock will be proportional to the noise within these spectral bandwidths. Hence, by judicious location of the carrier channels jitter, and thus bit error rate, can be reduced.

Figure 3:
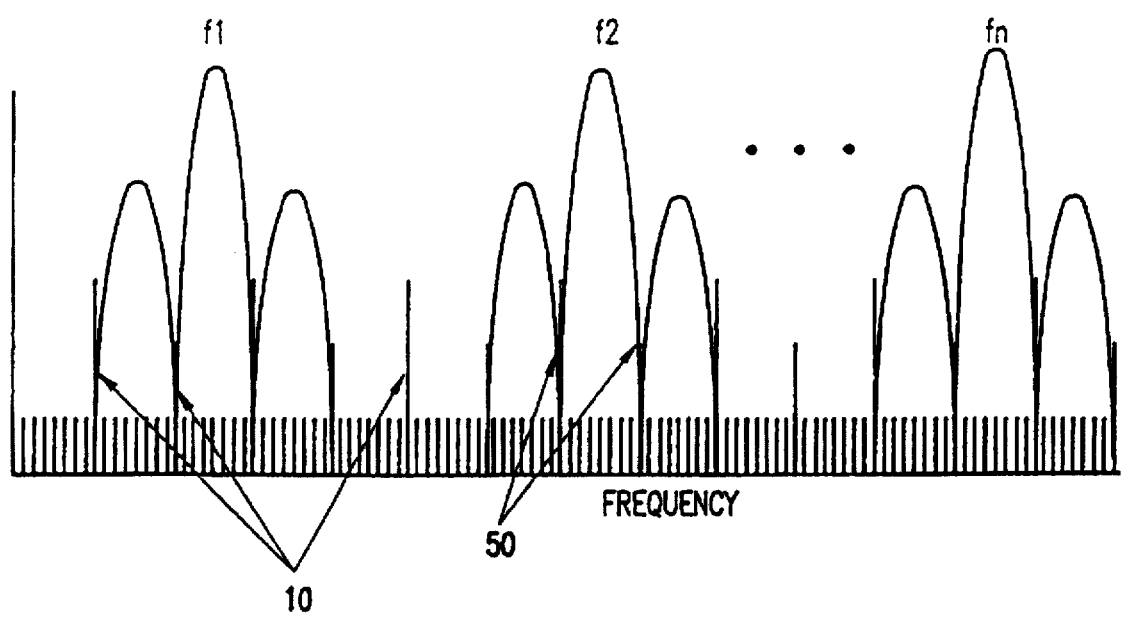
FIG. 3 is an amplitude versus frequency graph of the signals transmitted over the coaxial cable of FIG. 2.

A typical frequency spectrum of the signals that are transmitted over the coaxial cable 40 of FIG. 2 is shown in FIG. 3. FIG. 3 shows that number of parallel paths as "n" separate spectra. In the present embodiment "n" would be eight (8), corresponding to an eight bit byte. The center frequencies of the "n" spectra will be chosen to fall between the interfering frequencies 10. Note that the location of the nulls 50 of the main and side lobes correspond to the location of the interfering frequencies 10. The location of these interfering harmonics 10 is first determined through the use of a conventional spectrum analyzer.

The width of the "n" spectra is determined by the bit rate of the data. For example, if a carrier were to be placed at 1 MHz and the bit rate was at 0.01 MHz, the first nulls 50 in the spectrum would occur at 1.01 and 0.99 MHz. Thus, the spectrum of each of the individual carriers has been reduced by the ratio of the serial to parallel converter. In this case, the spectrum of each of the individual carriers has been reduced by eight. However, any number for this ratio may be chosen as required to fit the data between the spurious signals.

It will be appreciated that in accordance with the present invention a stream of information characterized by a relatively high data rate is transmitted over many channels selected to be of a form for transmission of relatively low data rates, in order that the frequency spectrum of the transmitted signals may be judiciously arranged to avoid interfering signals.

While the invention has been described in terms of the embodiments described above, those skilled in the art will recognize that the invention can be practiced with modification within the spirit and scope of the appended claims.

What is claimed is:

1. A method of transmitting data over a cable in a noisy environment having interfering frequencies, the method comprising the steps of:

receiving a serial data bit stream;

converting said serial data bit stream into a parallel data bit stream comprising n-bits;

generating n-carrier frequencies, each corresponding to one of said n-bits of said parallel data bit stream, wherein said n-carrier frequencies are selected such that they are located between the interfering frequencies;

modulating each of said n-bits onto said corresponding n-carrier frequency to produce n-modulated data signals; and combining said n-modulated data signals for transmission over the cable.

2. A method of transmitting data over a cable as recited in claim 1, further comprising the step of determining the location of the interfering frequencies.

3. A method of transmitting data over a cable as recited in claim 2, further comprising the steps of:

receiving and demodulating said n-modulated data signals from the cable to recover said parallel data bit stream; and converting said parallel data bit stream to recover said serial data bit stream.

4. A method of transmitting data over a cable as recited in claim 2 wherein a spectra width of each of said n-modulated data signals is determined by a bit rate of said serial data bit stream.

5. A method of transmitting data over a cable as recited in claim 2 wherein said interfering frequencies are caused by clock signals.

6. An apparatus for transmitting data over a cable in a noisy environment having interfering frequencies, comprising:

means for converting a serial data bit stream into a parallel data bit stream comprising n-bits;

means for generating n-carrier frequencies, each corresponding to one of said n-bits of said parallel data bit stream and being selected such that they are located between the interfering frequencies;

means for modulating each of said n-bits of said parallel data bit stream onto said corresponding one of said carrier frequencies to produce n-modulated data signals; and means for combining said n-modulated data signals for transmission over the cable.

7. An apparatus for transmitting data over a cable as recited in claim 6, further comprising:

means for receiving and demodulating said n-modulated data signals from the cable; and means for converting said parallel data bit stream into a serial data bit stream.

8. An apparatus for transmitting data over a cable as recited in claim 6 wherein a spectra width of each of said n-modulated data signals is determined by a bit rate of said serial data bit stream.

9. An apparatus for transmitting data over a cable as recited in claim 6 wherein said means for generating n-carrier frequencies comprises:

a carrier generator generating a base carrier frequency; and n-phase shift modulators connected to said carrier generator for shifting said base carrier frequency to generate n-carrier frequencies.

\* \* \* \* \*